Charles V. Biddy
INVENTOR

Feb. 18, 1969

C. V. BIDDY 3,428,402

APPARATUS FOR DETERMINING THE CONCENTRATION
OF A SUBSTANCE IN A SOLUTION

Filed Oct. 20, 1965

Charles V. Biddy
INVENTOR.

BY

ATTORNEYS

Charles V. Biddy
INVENTOR.

United States Patent Office 3,428,402
Patented Feb. 18, 1969

3,428,402
APPARATUS FOR DETERMINING THE CONCENTRATION OF A SUBSTANCE IN A SOLUTION
Charles V. Biddy, Houston, Tex.
(622 Bay Vista, Seabrook, Tex. 77586)
Filed Oct. 20, 1965, Ser. No. 498,541
U.S. Cl. 356—208        6 Claims
Int. Cl. G01n 21/06, 21/26; G01j 3/40

This invention relates to apparatus for determining the concentration of a substance in a solution where the concentration of such substance is proportional to a measurable characteristic of the solution.

Very often in industry and particularly in laboratories, it is necessary to determine the concentration of a given substance in a solution. Where the concentration of the substance in the solution is proportional to a measurable characteristic of the solution, such as the percentage of light transmitted through the solution or its pH, the concentration can be determined mathematically or from a standard curve that is preplotted from measurements made of solutions of known concentrations. Whether the concentration is determined by performing the necessary calculations or comparing the measured characteristic to a standard curve, it is a time consuming and tedious task that is subject to human error.

It is an object of this invention to provide apparatus for determining the concentration of a substance in a solution where said concentration is a function of some measurable characteristic of the solution.

It is another object of this invention to provide apparatus that will rapidly and accurately compare the quantitative measurement of a characteristic of a solution containing an unknown percentage of a substance with values of said characteristic for known concentrations of said substance.

It is another object of this invention to provide apparatus to determine the concentration of a given substance in a solution by comparing the optical density of the solution of unknown concentration with the optical density of solutions of known concentrations of said substance.

It is another object of this invention to provide such apparatus which can be easily and quickly converted to determine concentrations of a different substance in a solution where the concentration of the substance is proportional to a measurable characteristic of the solution.

It is yet another object of this invention to provide such apparatus which can be easily and quickly converted to sense different measurable characteristics of a solution to facilitate its use with different materials.

It is another object of this invention to provide such apparatus that can be easily calibrated.

These and other objects, advantages and features of the invention will be apparent to those skilled in the art from a consideration of this specification, attached drawings and appended claims.

The preferred embodiment of the invention will now be described in detail below in connection with the attached drawings in which.

Instruments are available for measuring the percentage of light transmitted through a chemical solution, its pH, fluorescence, conductivity, and other variable characteristics. Most, if not all of these instruments, can be arranged to provide an output electric signal that is proportional to the value of the characteristic measured.

With an electrical signal that is proportional to such characteristic of a solution of unknown concentration, the apparatus of this invention will compare the value of the measured characteristic to that of solutions of known concentrations of the substance and indicate the concentration of the substance in the solution. The measured characteristic may be one that should be converted or one that can be read directly, for example, percent of light transmission is converted usually to optical density before being compared to standard curves. On the other hand, pH may be read and used directly.

Figure 1:
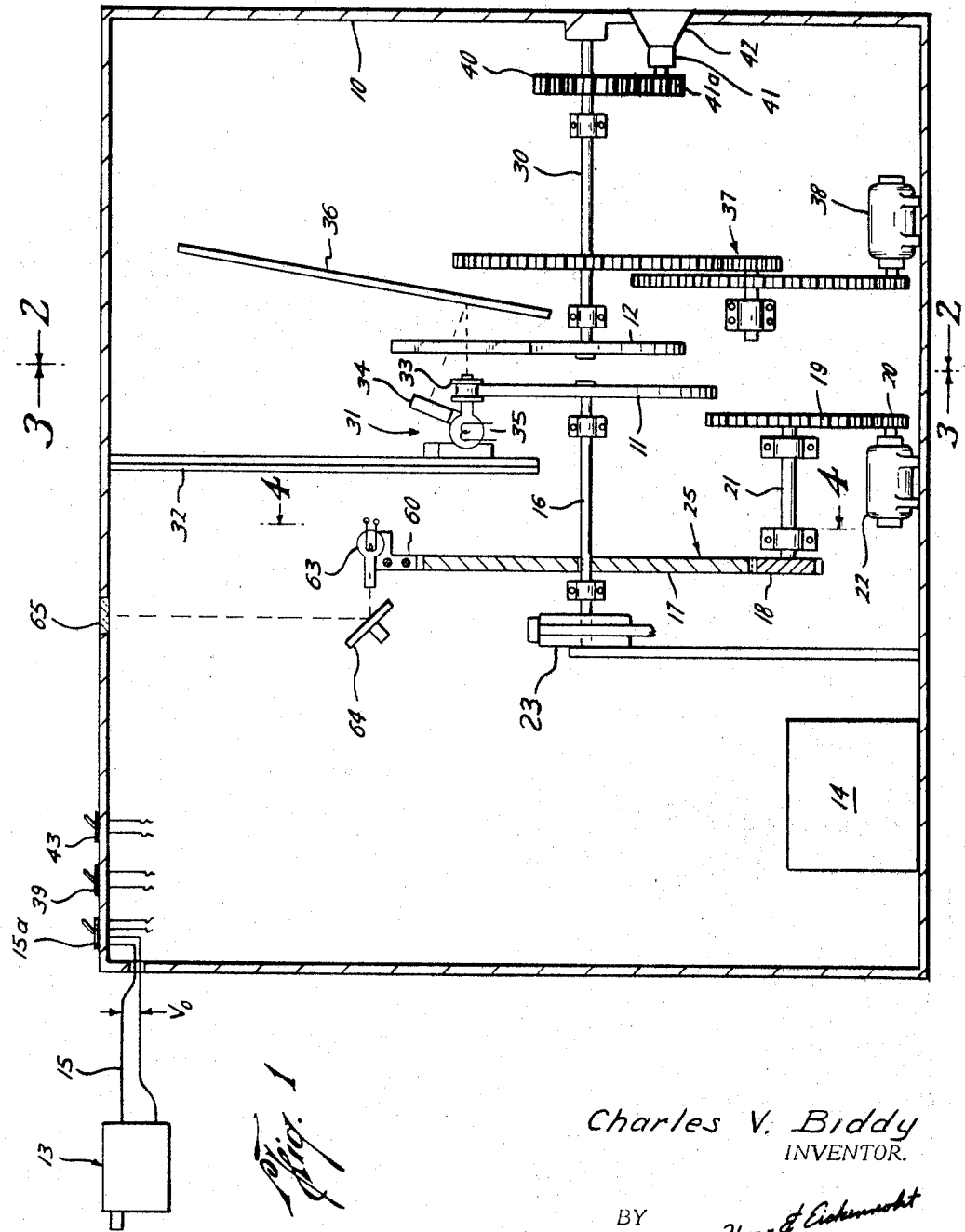
FIGURE 1, is a side view in elevation of the preferred embodiment of the apparatus.
Figure 2:
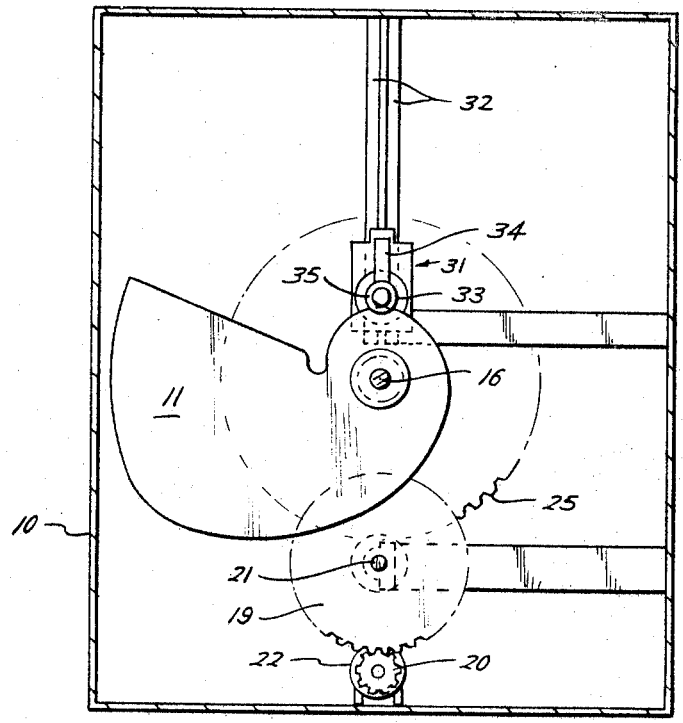
FIGURE 2, is a vertical sectional view taken along line 2—2 of FIGURE 1 in the direction of the arrows.

The characterisitc comparing apparatus of the invention, is shown enclosed in a housing 10. As shown in FIGURES 1 and 2, the apparatus includes an indicating cam 11. Its curvature is a function of the measured characteristic. Thus, if the measured characteristic is percent transmission of light, then the curvature of cam 11 corresponds to its optical density, which is a function of the percent of light transmitted. If the measured characteristic is pH, however, the curvature of the cam usually is representative of pH, since no conversion is required. In either case, of course, the curvature of the cam is a function of the measured characteristic.

In FIGURE 1, the instrument measuring the characteristic of the solution is indicated by the number 13. Output electrical signal $V_o$ of the instrument is supplied to the electrical circuitry of the apparatus as shown in FIGURES 1 and 7, through control switch 15a and leads 15.

Means are provided to rotate the indicating cam through an angle proportional to the amplitude of the electrical signal $V_o$. The mechanical apparatus for rotating the cam is shown in FIGURE 1. It includes shaft 16, upon which the cam is mounted, and gear train 25. The gear train comprises gears 17, 18, 19 and 20, plus shaft 21. Both shaft 16 and 21 are supported in the housing on appropriate bearings which are supported by the housing through appropriate support brackets. Gear 20 is mounted on the output shaft of electric motor 22. Potentiometer 23, in turn, is mounted on shaft 16 so that rotation of the shaft will move the movable contact of the potentiometer.

Figure 7:
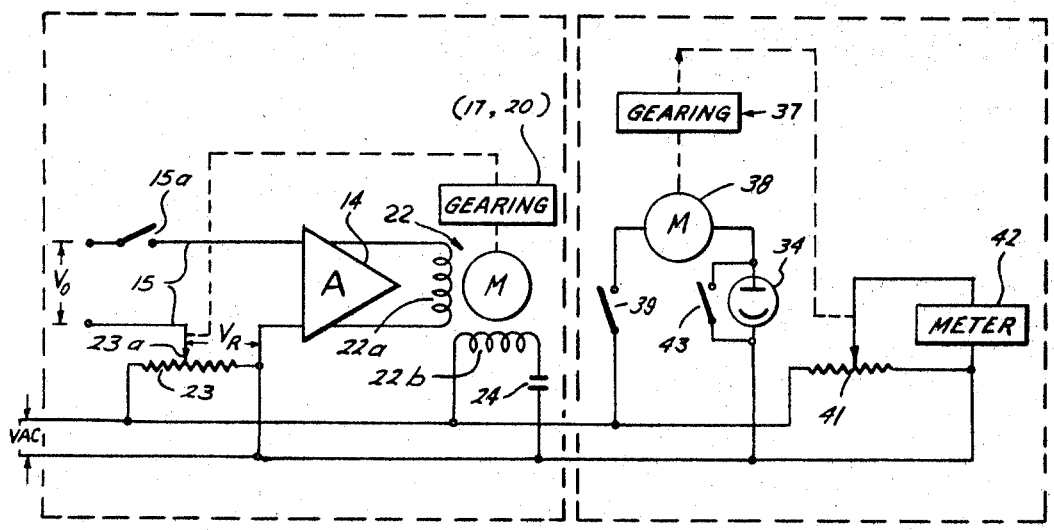
FIGURE 7 is a schematic diagram of the apparatus showing the electrical circuitry employed therewith.

The electrical circuit for rotating cam 11 a distance proportional to electrical signal $V_o$ is shown on the left-hand side of FIGURE 7. The resistive element of potentiometer 23 is connected across a source of constant voltage, which also provides power for the motor. The difference between the reference input voltage $V_o$ and $V_r$, the voltage determined by the position of potentiometer arm 23a, is fed through amplifier 14 and then to winding 22a of motor 22. Winding 22b is provided with a constant voltage, which is shifted 90° in phase by capacitor 24. If $V_r$, the voltage at the output of the potentiometer, is not equal to $V_o$, the reference input voltage, the servo mechanism, i.e., motor 22 operates to make this difference equal to zero despite any variations of the input voltage. Thus, when the electrical signal produced by instrument 13 is introduced into the circuit, motor 22 will rotate until it has moved potentiometer arm 23a to a position to so balance the voltages. Thus, the indicator cam 11 will be rotated to an angle that is a function of the input voltage which in turn is proportional to the measured characteristic of the unknown solution.

Means are provided to compare the value of the measured characteristic, as represented by the position of indicating cam 11, with corresponding values of the characteristic for solutions of known concentrations. In the apparatus shown in FIGURE 1, read-out cam 12 is provided with a curvature that is a function of the measured characteristic for solutions having known concentrations of the substance, the concentration of which is unknown in the solution being tested. Read-out cam 12 is mounted on shaft 30 for rotation therewith. The cam is positioned in parallel, face-to-face, spaced relationship with indicating cam 11.

As best shown in FIGURES 1 and 2, cam follower assembly 31 is slidably mounted between guide rails 32 for radial movement from the center of cam 11. The assembly is provided with a roller 33, which engages the edge of cam 11 and moves the follower assembly up and down along the guide rails as the cam is rotated. The follower assembly also includes photoelectric cell 34 and light source 35. The light source and photoelectric cell are positioned so that the light beam from the light source will strike the cell unless cut off in some way. In the embodiment shown the light beam strikes mirror 36, which is mounted in the housing at an angle to the direction of travel of the follower, and is reflected back upon the photoelectric cell. The follower assembly is mounted on one side of the plane of read-out cam 12 and the mirror is mounted on the other side. Thus, the beam of light from the light source passes through the plane of the read-out cam.

Read-out cam 12 is rotated by shaft 30, which is rotated by electric motor 38 through gear train 37. The shaft and gear train are supported on appropriate bearings mounted on brackets supported by the housing.

The electric circuitry of this portion of the apparatus is shown on the right-hand side of FIGURE 7. After the indicator cam has reached the position determined by the amplitude of input signal $V_o$, switch 39 is closed to supply electrical power to motor 38. The electrical circuit in which the motor is located includes photoelectric cell 34. Thus, as long as light from light source 35 falls on the photoelectric cell the motor will rotate read-out cam 12. It will continue to do so until the cam intersects the beam of light from light source 35. When this occurs, the photoelectric cell will cut off the power to the motor and rotation of the read-out cam will stop. Thus, the read-out cam will be rotated through an angle determined by the position of indicator cam 11. This angle being representative of a given value of the measurable characteristic corresponds to a given concentration of a substance in the solution being tested.

Various means can be provided to indicate visually or print out the result obtained. On the embodiment shown, gear 40 is mounted on shaft 30 to rotate therewith and drive potentiometer 41 through pinion 41a. By properly calibrating the potentiometer 41 in FIGURE 7, it can adjust the voltage across voltmeter 42 to provide a direct reading of the concentration of the substance in the solution.

After the reading has been taken, switch 15a can be opened and servo motor 22 will rotate the indicator cam back to its original position, i.e., where the cam follower is closest to shaft 16. The read-out cam can be returned to its original position by closing re-set switch 43 to shunt photoelectric cell 34 and run motor 38 until meter 42 is again indicating zero. The apparatus is then ready to determine the concentration of the substance in another solution. The radial distance from shaft 30 to the edge of the read-out cam just below the light beam should be such that it will not cut off the light from reaching the mirror.

Figure 3:
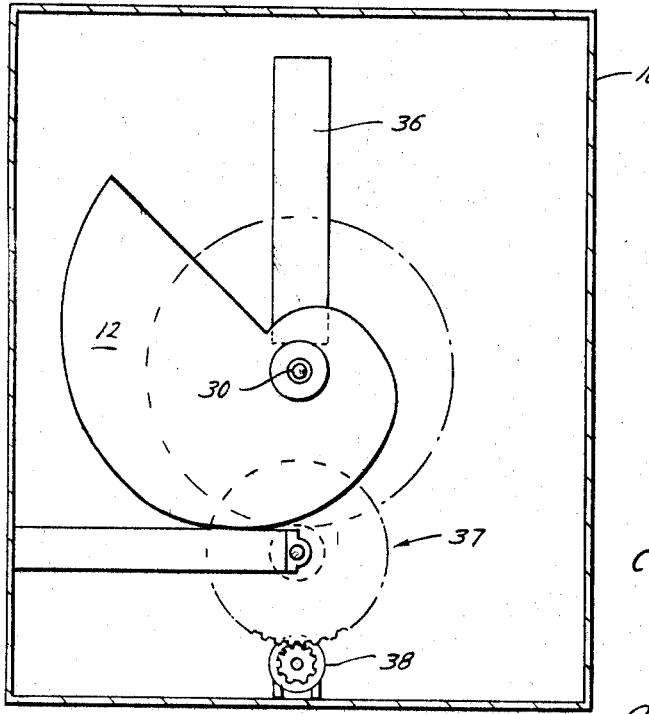
FIGURE 3, is a vertical sectional view taken along line 3—3 of FIGURE 1 in the direction of the arrows.

FIGURES 2 and 3 show typical indicator and read-out cams, where percent of light transmission and optical density is being employed to determine the concentration of a substance in a solution. The cams shown were designed for determining the concentration of a substance in a solution by measuring its optical density.

Figure 5:
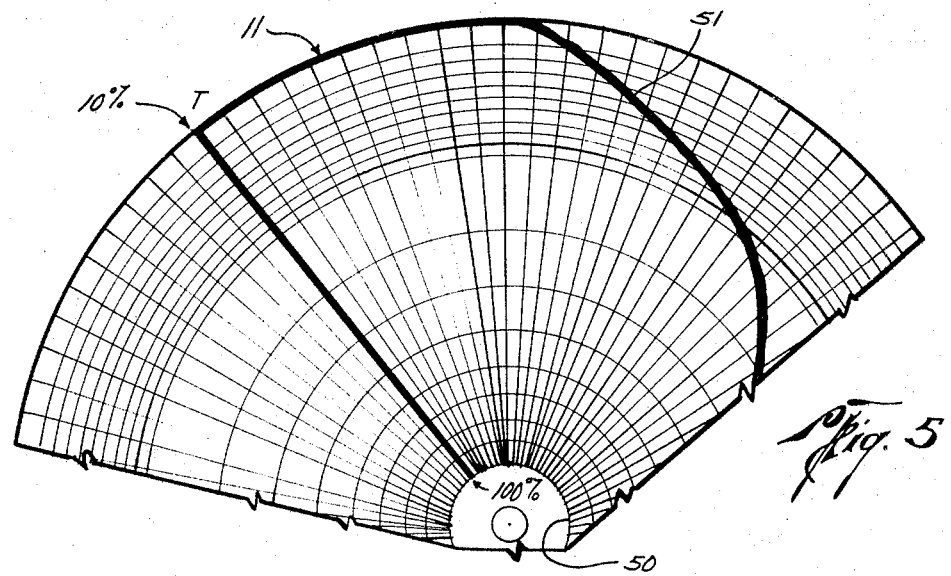
FIGURES 5 and 6 illustrate how the curvatures of the cams shown in FIGURES 2 and 3 are designed.
Figure 6:
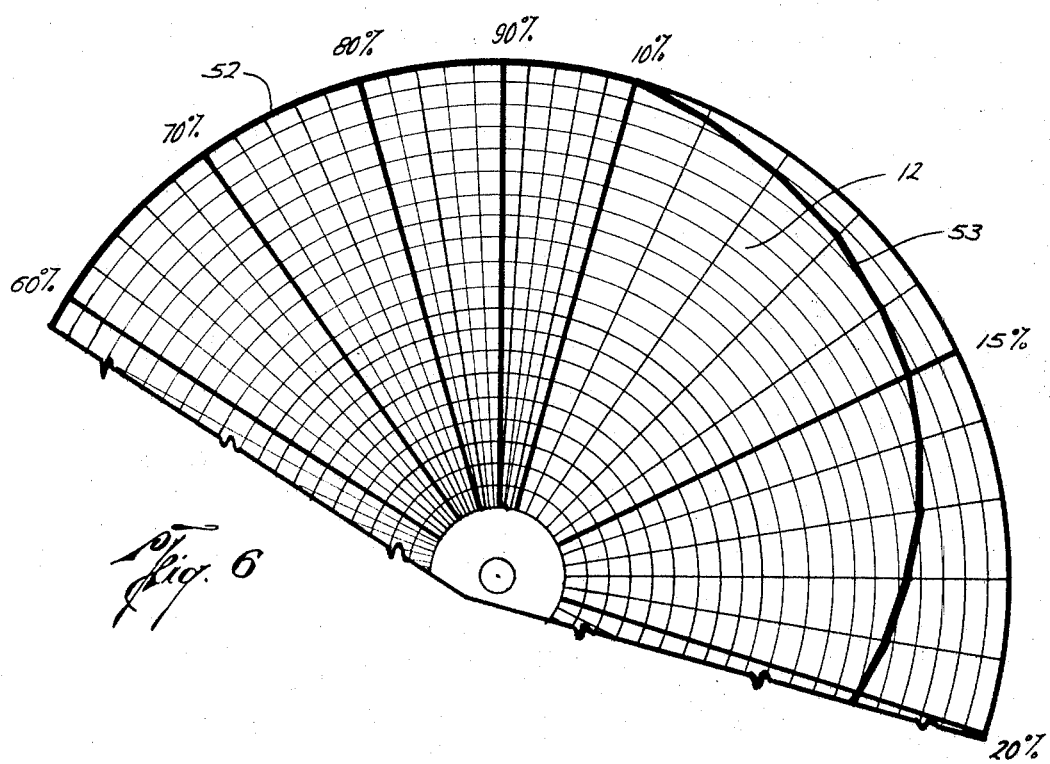

FIGURES 5 and 6 illustrates how the two cams are laid out for this purpose. Optical density is equal to the logarithm of $100/x$, where $x$ is the percent transmission of the unknown being measured. Since values of percent transmission below 10% are subject to considerable error and are not usually considered in practice, values below this amount are not plotted on the cam. As shown in FIGURE 5, polar graph paper is employed for the indicator cam. The paper has a circumference divided into a hundred equal parts. Each segment then will represent one percent light transmission. The inner circle or hub 50 then represents 100% light transmission (100% T) and the outer circle represents 10% light transmission (10% T). Between these limits the equation optical density is equal to the log of 100/percent transmission, is plotted to obtain curve 51. The polar graph paper then is glued to a piece of stiff cardboard and the cam can be cut out along curve 51.

Read-out cam 12 is laid out as shown in FIGURE 6. Here polar graph paper is again employed, however, in this case outer circle 52 of the graph is divided logarithmically between the values of 10 and 100. The outer circle represents percent concentration. The radial lines are divided incrementally to represent optical density. The measured optical density for various known concentrations is then plotted on the graph to obtain curve 53, which represents percent concentration as a function of optical density. In this way, cams can be designed for any desired solution.

Figure 4:
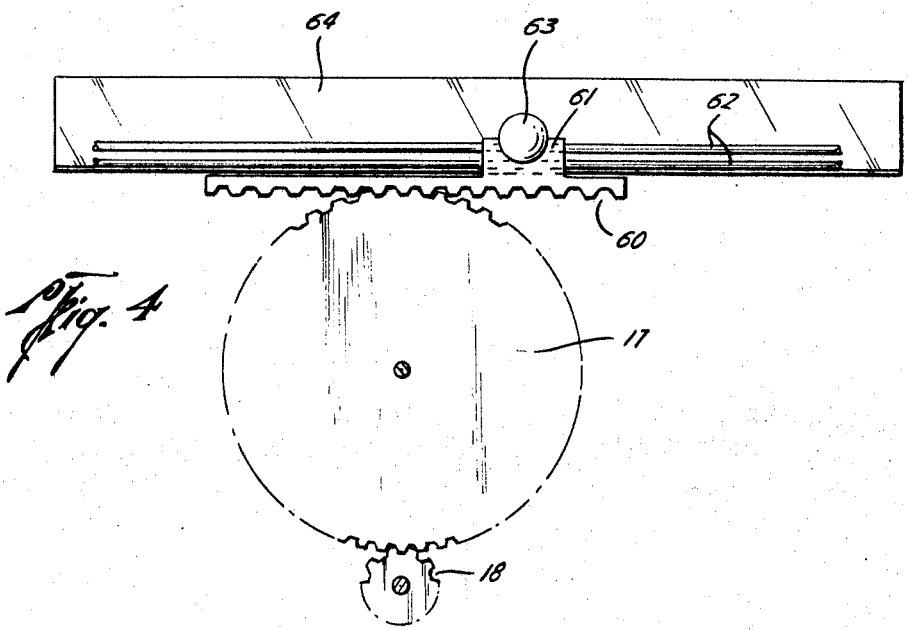
FIGURE 4, is a vertical sectional view taken along line 4—4 of FIGURE 1.

For calibration purposes, the apparatus is arranged to provide a visual display of the angle through which shaft 16 and indicator cam 11 are rotated. As shown in FIGURES 1 and 4, gear 17 engages rack 60 so rotation of the gear will move the rack longitudinally. Guide block 61 is attached to the rack. It is provided with openings through which guide bars 62 extend. The guide bars provide a sliding support for the rack and guide block as they are moved by gear 17. Mounted on the guide block is light source 63 which emits a beam of light against inclined mirror 64. The mirror reflects the light against a translucent ground glass screen 65 mounted in the wall of housing 10. The glass screen can be calibrated to indicate the angle of rotation of cam 11 to provide a visual scale for calibrating the apparatus.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for determining the concentration of a substance in a solution having a measurable characteristic that varies with the concentration of said substance in the solution, said apparatus comprising means for measuring said characteristic and providing an electrical signal having an amplitude proportional to said measurable characteristic, an indicating cam having a curvature representative of a function of said measurable characteristic, means for rotating said cam through an angle proportional to the amplitude of the electrical signal, a read-out cam having a curvature representative of said function of said measurable characteristic of the solution for known concentrations of said substance, means for rotating said read-out cam through an angle determined by the position of the indicating cam, and means responsive to the angle of rotation of the read-out cam to indicate the concentration of said unknown solution.

2. The apparatus of claim 1 in which the means for rotating the read-out cam includes an indicating cam follower, means mounting the follower for longitudinal movement by the indicating cam as the cam is rotated, electrical circuit means for supplying power to rotate the readout cam, a photoelectric cell in said circuit and mounted on the follower for movement therewith, said cell permitting current flow in the circuit only when the cell is exposed to light, a light source mounted on the follower for movement therewith with a light beam directed against the cell through the plane of the read-out cam, whereby the angle of rotation of the indicating cam and the corresponding longitudinal movement of the follower will determine the angle through which the read-out cam can rotate before it breaks the light beam and interrupts the flow of electrical power rotating the read-out cam.

3. The apparatus of claim 2 in which the photoelectric cell and the light source are mounted on the follower on one side of the plane of the read-out cam and a mirror is located on the other side of said plane to reflect the light beam back to the cell.

4. The apparatus of claim 1 further provided with means for visually displaying the angle through which the reading cam has been rotated, said means including a housing for the apparatus having a translucent panel graduated in degrees of rotation, a light source directed toward said panel, and means for moving the light longitudinally a distance proportional to the angle of rotation of the indicating cam.

5. Apparatus for determining the concentration of a given substance in a solution from an electrical signal that is proportional to the percentage of light transmitted through the solution where said percentage of light transmission is a function of the concentration of said substance in the solution, said apparatus comprising, means receiving the light passing through the solution and converting it to an electrical signal, an indicator cam having a curvature representative of the variation of optical density with respect to percentage of light transmission, an indicator cam follower, means responsive to the electrical signal for rotating the cam through an angle proportional to the percentage of light transmission through the solution having an unknown concentration of said substance to thereby move the cam follower through a distance proportional to the optical density of the solution; a read-out cam having a curvature representative of the variation of optical density with known concentrations of said substance in a solution, means for moving the read-out cam through an angle determined by the position of said cam follower, and means responsive to said angle of rotation of the read-out cam for indicating the concentration of the substance in the solution.

6. The apparatus of claim 5 in which electrical circuit means are provided to supply the power to rotate said read-out cam, a photoelectric cell included in said circuit and mounted on said cam follower for movement therewith, said cell controlling current flow in the circuit in response to the intensity of light, a light source mounted to move with the cell and to provide a beam of light to actuate the cell, said light source being mounted for the light beam to pass through the plane of the read-out cam before it reaches the cell whereby the circuit will supply power to rotate the read-out cam until the cam intersects the light beam.

No references cited.

JEWELL H. PEDERSON II, *Primary Examiner.*

O. B. CHEW, *Assistant Examiner.*

U.S. Cl. X.R.

250—218; 23—255, 259; 73—61.1; 324—30